May 20, 1947.  R. C. GAYLORD  2,420,945
COMBINATION TOOL HOLDER AND STEADY ARM
Filed Sept. 20, 1943  2 Sheets-Sheet 1
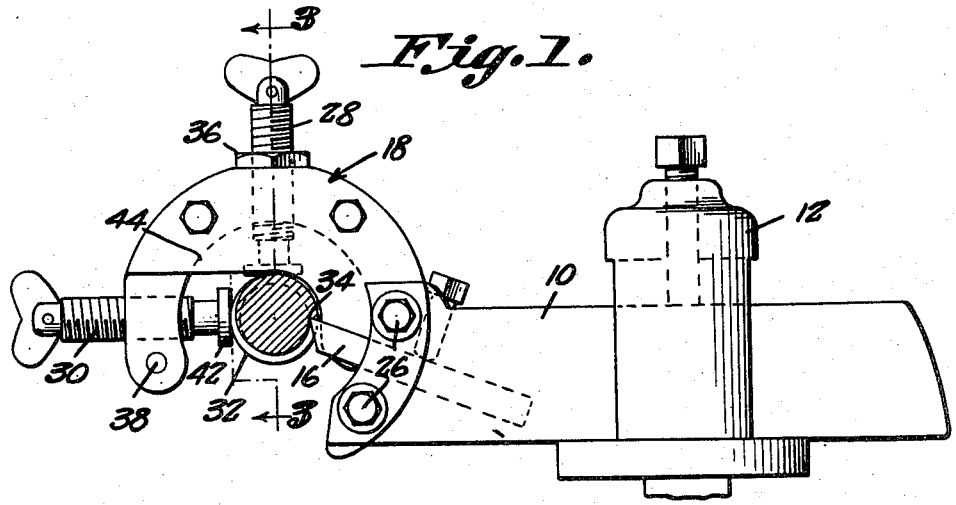
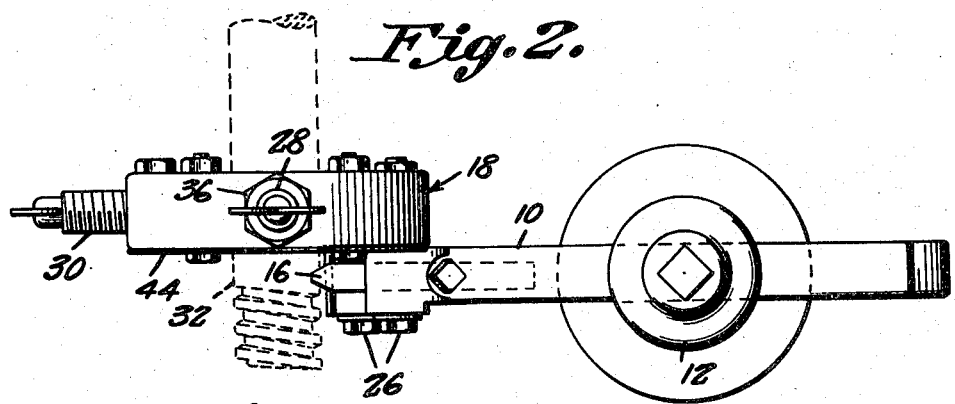
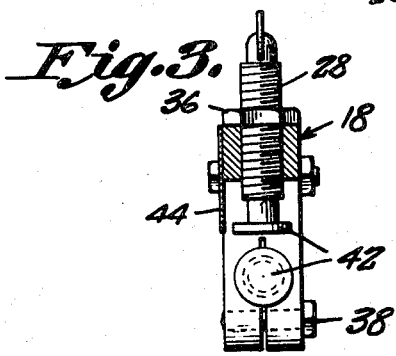
Roland C. Gaylord,
INVENTOR.
BY
ATTORNEYS May 20, 1947.  R. C. GAYLORD  2,420,945
COMBINATION TOOL HOLDER AND STEADY ARM
Filed Sept. 20, 1943   2 Sheets-Sheet 2
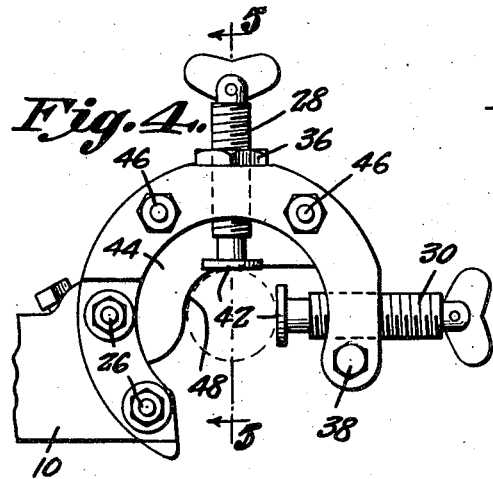
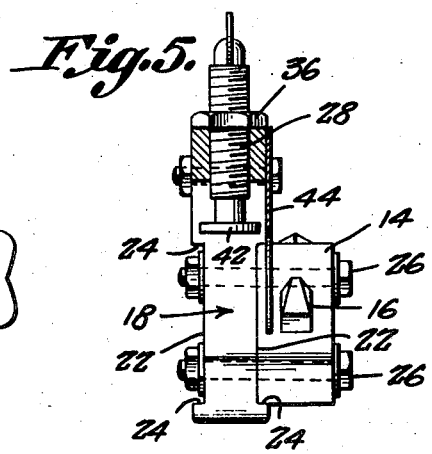
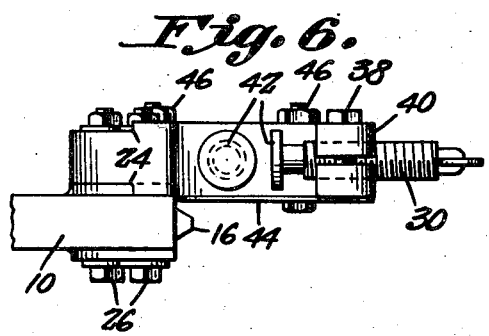
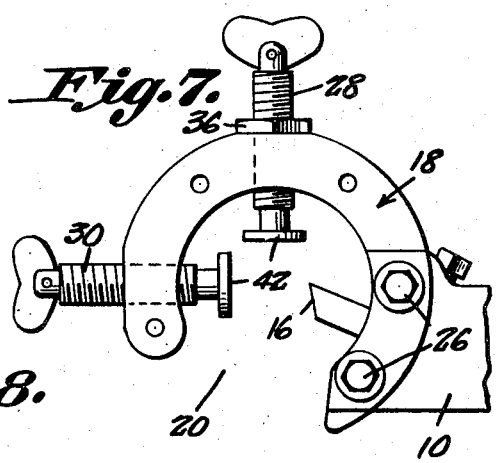
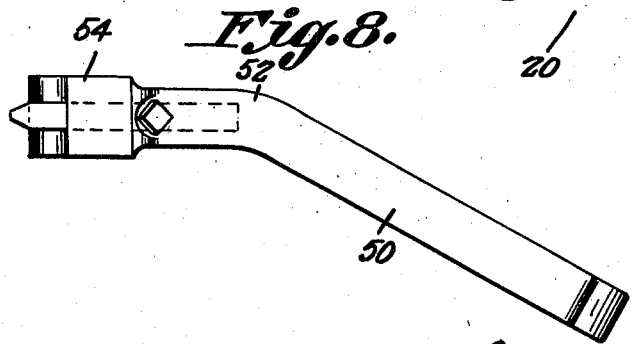
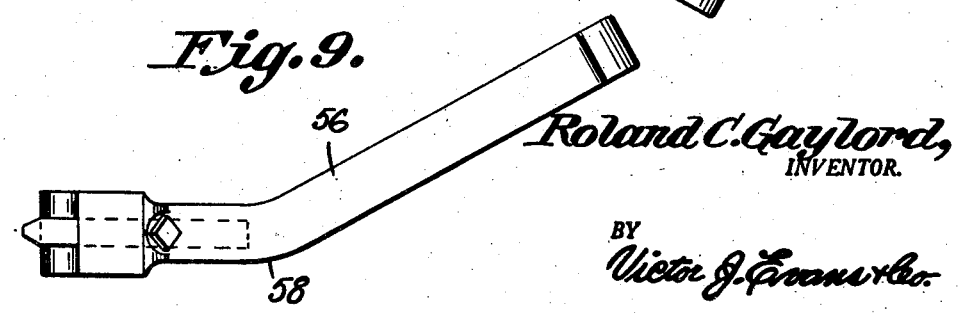
Roland C. Gaylord,
INVENTOR.
BY
Victor J. Evans & Co.
ATTORNEYS Patented May 20, 1947

2,420,945

UNITED STATES PATENT OFFICE 2,420,945

COMBINATION TOOLHOLDER AND STEADY ARM

Roland C. Gaylord, Newport News, Va.

Application September 20, 1943, Serial No. 503,147

1 Claim. (Cl. 82—35)

My invention relates to lathes, and has among its objects and advantages the provision of an improved tool and work support operating to effectively support the work against cutter thrust.

In the accompanying drawings—

Figure 1 is a side view of the tool holder and work support.

Figure 2 is a top view.

Figure 3 is a sectional view along the line 3—3 of Figure 1.

Figure 4 is a face view of the opposite side of the work support.

Figure 5 is a view taken along the line 5—5 of Figure 4.

Figure 6 is a bottom view.

Figure 7 is a side view of a portion of the work support.

Figure 8 is a top view of a modified form of tool holder, and

Figure 9 is a top view of a different form tool holder.

In the embodiment of the invention selected for illustration, I make use of a stem 10 shaped for coaction with the usual holder 12 such as is used in connection with engine lathes and the like. One end of the stem 10 includes a head 14 adapted to support a conventional cutting tool 16. To this end of the stem is attached a work support 18 curved throughout an arc exceeding 180 degrees. The opening 20 in the work support 18 is sufficiently large to permit the support to slip easily over the work.

Each side of the work support 18 is recessed at 22 to provide shoulders 24. Figure 5 illustrates the head 14 as being mounted inside one of the recesses 22 and fixedly secured to the work support by two bolts 26. The head 14 fits snugly between the two shoulders 24 so as to relieve the bolts 26 from any strain incident to any pressures transmitted to the work support.

Work engaging screws 28 and 30 are threaded in the work support 18, the screw 30 being generally axially arranged with respect to the stem 10, while the screw 28 is positioned with its axis at right angles to the screw 30. Both screws 28 and 30 engage the work 32, as in Figure 1, with the cutting end 34 of the tool 16 also engaging the work. A lock nut 36 is threadedly connected with the screw 28 and engages the work support 18 to secure the set screw against accidental rotation. The screw 30 is made secure through tightening of a bolt 38 passing through the slotted end 40 through which the screw 30 is threaded. Both screws are provided with work engaging end faces 42.

To one side of the work support 18 is attached a cutting deflector 44 in the nature of a thin plate made secure by bolts 46. This deflector is provided with a curved edge 48 positioned closely to the work 32 to prevent cuttings from passing into the work support. Figure 7 illustrates the work support without the deflector.

Figure 8 illustrates a stem 50 having a bend 52 therein so that the head 54 may be brought close to a chuck or the like when operating at one end of the work. The stem 56 of Figure 4 is reversely bent at 58. Thus the stems of Figures 8 and 9 facilitate operations at the right and left ends of the work. The work support 18 may be attached to either side of the head 14, depending upon which end of the work requires such relative positioning of the work support.

My invention comprises a combined tool holder and steady arm. It eliminates the steady rest and follow rest bolted to lathe carriages. This tool operates to eliminate vibration and chattering.

Without further elaboration, the foregoing will so fully explain my invention, that others may, by applying current knowedge, readily adapt the same for use under various conditions of service.

I claim:

In a lathe, a combination tool holder and steady arm comprising a cutting tool supporting stem having a head in which the cutting tool is carried arcuate means attached to one end of said stem, and extended to exceed 180 degrees to partly encircle work engaged by the cutting tool, adjustable work supporting means threadably connected with said first mentioned means engageable with the work at spaced points, said first mentioned means being provided with two spaced shoulders upon opposite sides, said stem being shaped to fit snugly between either set of shoulders and in engagement therewith for selectively positioning and holding said first mentioned means on either side of the stem and bolt means attaching said first mentioned means to said stem.

ROLAND C. GAYLORD.

REFERENCES CITED

The following references are of record in the file of this patent:

UNITED STATES PATENTS

| Number | Name | Date |
|---|---|---|
| 245,668 | Smith | Aug. 16, 1881 |
| 407,972 | Springer | July 30, 1889 |
| 488,145 | Hurley | Dec. 13, 1892 |
| 1,253,799 | Ecker | Jan. 15, 1918 |
| 2,210,605 | Speckert | Aug. 6, 1940 |